(12) United States Patent
Jones

(10) Patent No.: US 6,767,379 B2
(45) Date of Patent: Jul. 27, 2004

(54) COMPUTER BOX FILTER SYSTEM

(76) Inventor: William H. Jones, 3701 SW Southern, Seattle, WA (US) 98126

( * ) Notice: Subject to any disclaimer, the term of this patent is extended or adjusted under 35 U.S.C. 154(b) by 0 days.

(21) Appl. No.: 10/021,104

(22) Filed: Oct. 29, 2001

(65) Prior Publication Data
US 2003/0079449 A1 May 1, 2003

(51) Int. Cl.$^7$ .............................................. B01D 50/00
(52) U.S. Cl. ........................... 55/385.6; 55/493; 55/506
(58) Field of Search ............................. 55/385.6, 493, 55/495, 496, 422, 506, DIG. 31, DIG. 35

(56) References Cited

U.S. PATENT DOCUMENTS

| | | | |
|---|---|---|---|
| 3,971,877 A | | 7/1976 | Lee ........................... 174/16 R |
| 4,889,542 A | | 12/1989 | Hayes .......................... 174/97 |
| 5,163,870 A | * | 11/1992 | Cooper ........................ 454/184 |
| 5,223,006 A | | 6/1993 | Moran, III ..................... 55/124 |
| 5,462,569 A | * | 10/1995 | Benjamin .................. 55/385.6 |
| 5,676,718 A | | 10/1997 | Davison et al. ............ 55/385.6 |
| 5,730,770 A | | 3/1998 | Greisz ........................ 55/385.6 |
| 5,766,285 A | * | 6/1998 | Killman ..................... 55/385.6 |
| 5,827,340 A | * | 10/1998 | Fiske ......................... 55/385.6 |
| 5,935,282 A | * | 8/1999 | Lin ............................. 55/385.6 |
| 6,297,950 B1 | * | 10/2001 | Erwin ......................... 361/685 |
| 6,309,437 B1 | | 10/2001 | Jones ........................ 55/385.1 |
| 6,319,116 B1 | * | 11/2001 | Behl .......................... 454/187 |
| 6,533,835 B2 | * | 3/2003 | Wilson et al. ................ 55/481 |

FOREIGN PATENT DOCUMENTS

DE 19722893 A1 * 12/1998

* cited by examiner

Primary Examiner—Frank M. Lawrence
(74) Attorney, Agent, or Firm—Dean A. Craine

(57) ABSTRACT

A computer box filter system for a computer box including a hollow, u-shaped frame assembly that selectively attaches to a computer box. The frame assembly includes a plurality of holes formed on its inside surface which are aligned and registered with holes formed on the sides of the computer box. Disposed inside the frame assembly is replacable air filter. In one embodiment, the system includes a closeable door cover that attaches to the frame assembly and selectively closes over the entire front surface of the computer box. The frame assembly includes an extending lip which properly aligns the lower section of the frame assembly on the computer box so that the edges of the door cover may be pressed against the edges of the frame assembly during use to form a seal around the front surface.

4 Claims, 4 Drawing Sheets

COMPUTER BOX FILTER SYSTEM

BACKGROUND OF THE INVENTION

1. Field of the Invention

This invention relates to air filters for computers and, more particularly, to air filters designated to cover the entire surface of a computer box to filter air drawn into the computer box through openings on the surface.

2. Description of the Invention

Located inside most computers is a fan that draws outside air into the computer box to cool the CPU and other components located inside. As the CPU's clock speed increases, a greater amount of air must be drawn into the computer box to cool the CPU. Unfortunately, when more air is drawn into the computer box, more dust and dirt accumulates inside.

It is widely known that a large quantity of the air drawn into the computer box enters through switch and light openings and through floppy and CD-ROM disc drives drive openings located on the front surface of the computer box. It is also widely known that the shape or profile of the front surface on the computer box varies with different computer manufacturers. The height and width of the computer box varies also.

What is needed is a filter cover that can be selectively used to substantially cover different shaped front surfaces and different sizes of computer boxes.

SUMMARY OF THE INVENTION

It is an object of the present invention to provide a filter cover that substantially covers the front surface of a computer box.

It is an object of the present invention to provide such a filter cover that can be used on computer boxes with holes formed on the sides of the computer box.

It is another object of the invention to provide such a filter cover that can be used with different size computer boxes.

These and other objects of the present invention are met by a computer box filter system for a computer box with air vent holes formed on the sides of the computer box. The system includes a vertically aligned frame assembly that selectively attaches over the vent holes located on the sides of the computer box. The frame assembly is a hollow, u-shaped shaped structure designed to fit snuggly over the front section of the computer box. Disposed inside one side member of the frame assembly is a longitudinally aligned space in which a replaceable air filter is disposed. In the preferred embodiment, the side member is a channel structure with a longitudinally aligned opening formed on its inside surface. During installation, the side member is aligned on the computer box so that the longitudinally aligned opening is aligned and registered over the side openings on the side of the computer box. Formed on the front surface of the side member are a plurality of air vents with allow air located immediately in front of the computer box to pass through the frame assembly, pass through the filter, and then enter the side holes. In a second embodiment, the holes on the front surface of the frame assembly are replaced with holes formed on the outside surface of the frame assembly so that outside air may directly enter the computer box.

Attached to the frame assembly is an optional door cover that selectively moves between an open and closed position over the front face of the computer box. In one embodiment, air vent holes are formed on the front surface of the door cover that enables air to enter the space located immediately in front of the computer box. An optional second filter may be placed in the door.

In the preferred embodiment a pivoting means, such as a pair of hinges, is disposed between the frame assembly and the door cover enabling the door cover to be selectively opened and closed thereon. The frame assembly includes a forward extending abutment means which properly aligns the frame assembly on the computer box so that the edges of the door cover may press against the edges of the frame assembly during use, thereby creating a seal.

DESCRIPTION OF THE PREFERRED EMBODIMENT(S)

Figure 1:
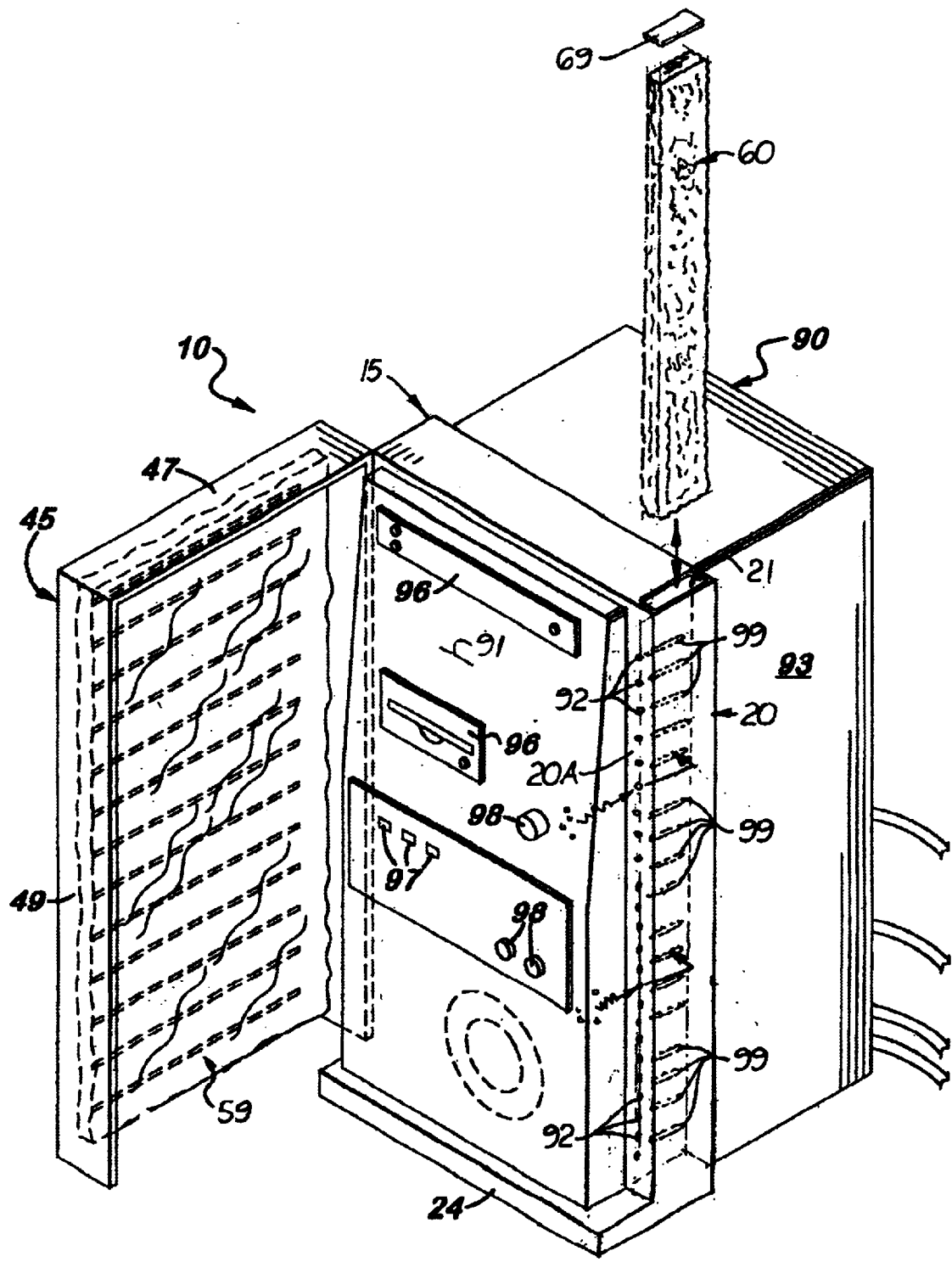
FIG. 1 is a perspective view of the computer box filter system with a u-shaped frame member having air vent holes formed on its front surface.
Figure 2:
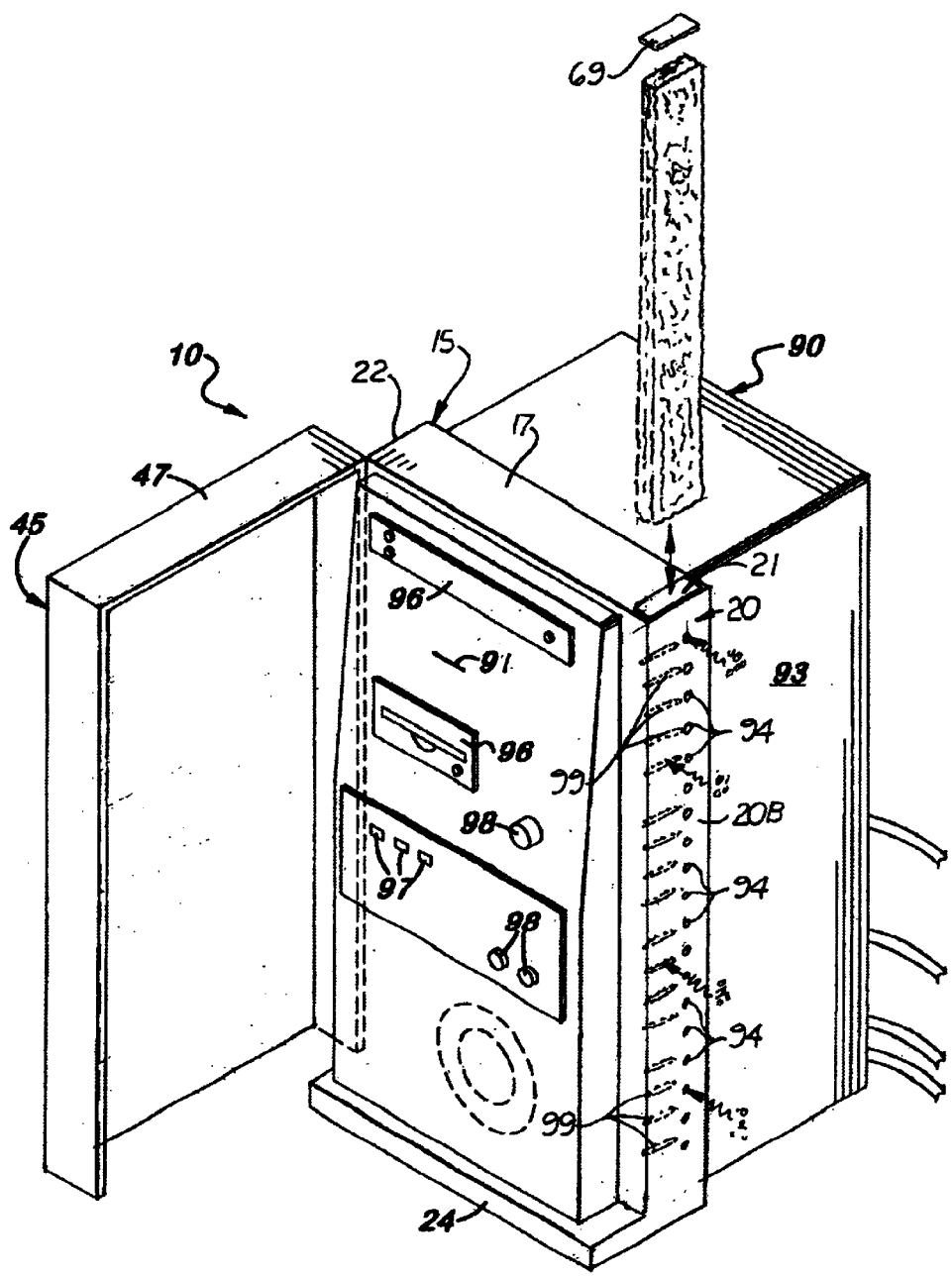
FIG. 2 is a perspective view of the computer box filter system with a u-shaped frame member having air vent holes formed on its outside surface.
Figure 3:
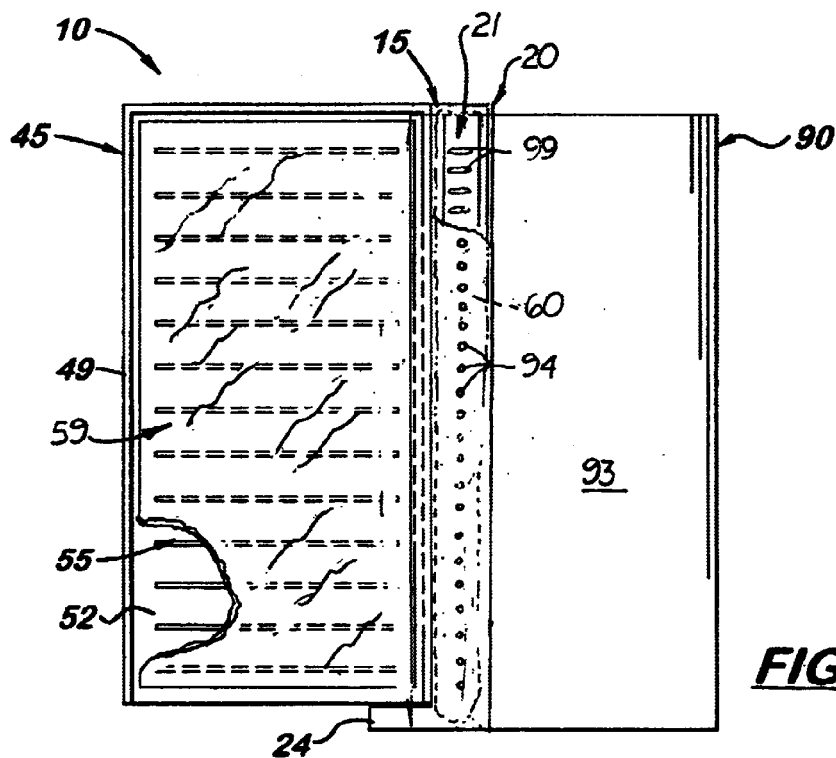
FIG. 3 is a left side elevational view of the filter cover attached to a computer box.

Shown in the accompanying FIGS. 1–6, there in shown by a computer box filter system 10 for a computer box 90 that includes a frame assembly 15 that selectively attaches to a computer box 90. The filter system 10 also includes a u-shaped frame assembly 15 that selectively attached to the computer box 90. An optional door cover 45 pivotally attaches to the frame assembly 15 that, during use, selectively opens and closes over the front surface 91 of the computer box 90. During use, air may be drawn into the computer box 90 through various openings 96, 97, 98 formed on the front surface 91 or through a plurality of side openings 99 located on the side surface 93 of the computer box 90. Located inside the frame assembly 15 is an air filter 60, through which air may be drawn through holes 92, 94 formed on its front and outside surfaces 20A, 20B, respectively.

The frame assembly 15 is transversely aligned and attached to the computer box 90 parallel and adjacent to the front surface 95. The fame assembly 15 may includes an abutment means which properly aligns the frame assembly 15 on the computer box 90 so that the edges of the door cover 45 press against the edges of the frame assembly 15 when the door cover 45 is closed. The abutment means also allows the position of the frame assembly 15 on the computer box 90 to be adjusted so that the door assembly 45 may close on different shapes or profiles of front surfaces 95. In the preferred embodiment, the abutment means is a forward extending lip member 24 located on the lower section of the frame assembly 15.

In addition to the lip member 24, the frame assembly 15 also includes an elongated top member 17, and two side members 20, 22. In the embodiment shown in FIGS. 1–4, the top member 17, and two side members 20, 22, are elongated, rigid structures separately attached or integrally formed together to create an inverted, u-shaped structure that slides vertically and fits snuggly around the computer box 90. In the preferred embodiment, the side member 20 is hollow, channel structure in which a longitudinal space 21 is created for an elongated filter 60. The top member 17 and side member 22 may be a hollow channel or tube or a solid bar material. In the first embodiment, shown in FIG. 1, a plurality of air inlet holes 92 are formed on the front surface 20A of the side member 20 which are used to allow air located near the front surface 91 of the computer box 90 to enter the center space 21 of the side member 20. When the door cover 45 is used, air is able to pass through the door cover 45 and into the side member 20 via the inlet holes 92. In a second embodiment, shown in FIG. 2, the holes 92 are replaced with holes 94 formed on the outside surface 20B of the side member 20 which are useful when a solid door cover 45 is attached to the computer box 90.

The lip member 24 is L-shaped structure, perpendicularly aligned and forward-extending from the opposite lower ends of the two side members 20, 22. During use, the frame assembly 15 is placed over the computer box 90 so that the inside surface of the lip member 24 is pressed inward to make contact with the front, lower edge of the computer box 90. The lip member 24 acts to prevent the lower section of the frame assembly 15 from moving inward over the computer box 90, during use.

Figure 4:
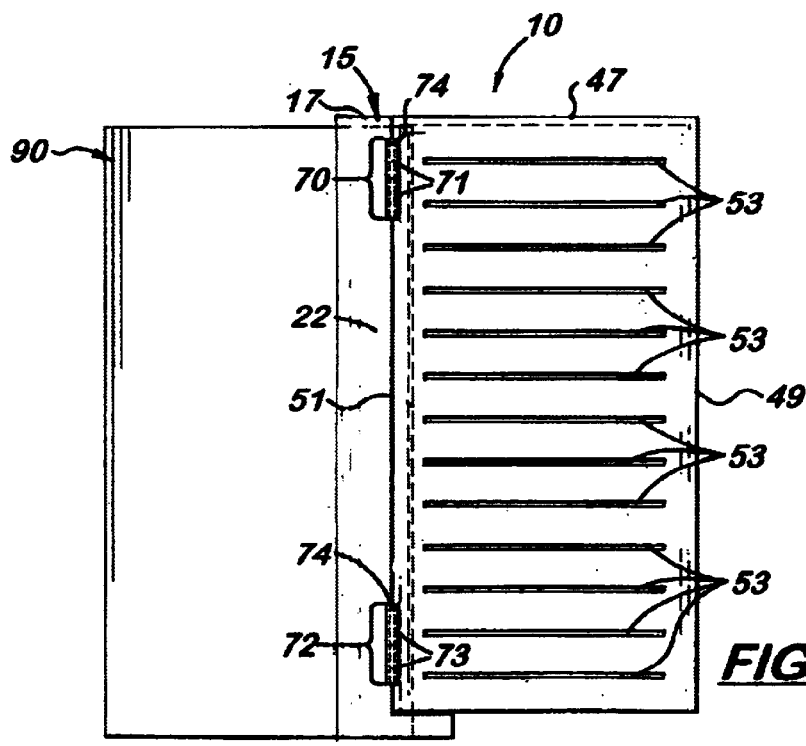
FIG. 4 is a right side elevational view of the filter cover attached to a computer box.
Figure 5:
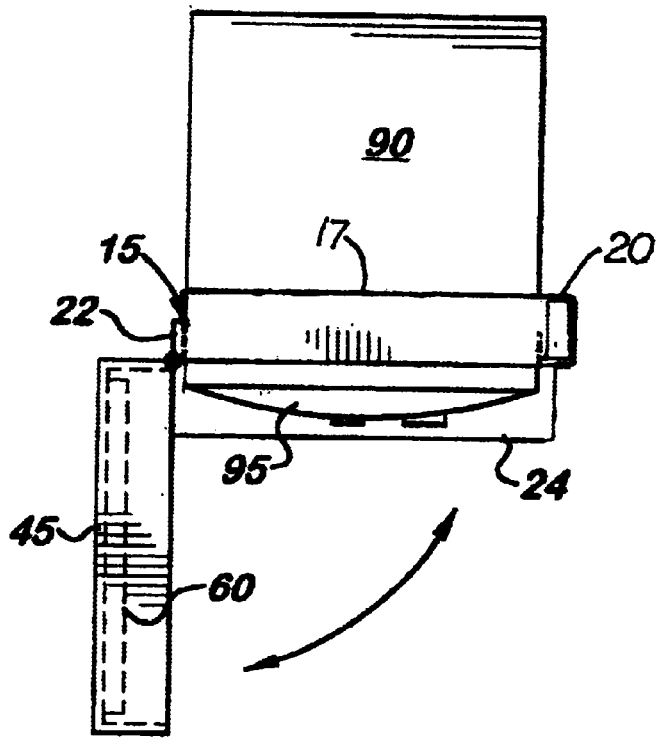
FIG. 5 is a top plan view of the filter cover attached to a computer box.
Figure 6:
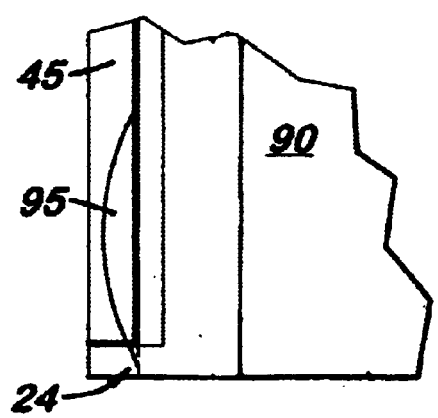
FIG. 6 is a partial, side elevational view of the filter cover.

The door cover 45 is a deep, rectangular-shaped covering comprising a top panel 47, two parallel side panels 49, 51, and a front panel 52, all of sufficient length and width so that the door cover 45 may cover the front surface 95 of the computer box 90 when closed thereover. The width of the top panel 47 and two side panels 49, 51 are sufficiently wide as to create a deep central space 55 inside the door assembly 45. The bottom of the door assembly 45 is open so that the lip member 24, discussed above, may extend into the central space 55 when the door assembly 45 is closed. A plurality of optional air inlet openings 53 may also formed on the front panel 52 so that air may be drawn there through. Disposed inside the central space 55 is an optional filter 59. Attached to the adjoining side member 22 of the frame assembly 15 and the side panel 49 of the door assembly 45 are two pairs of hinges 70, 72, respectively. As shown in FIG. 4, the adjoining pairs of hinges 70, 72 are connected together via pins 74 that extend through bores 71, 73, formed on hinges 70, 72, respectively.

As mentioned above, a main elongated air filter 60 is disposed inside the longitudinal space 21 located inside the side member 20. The filter 60 is sufficient in length and width to cover all of the inlet holes 92, or 94 formed on the side member 20 and the side air vents 99 on the side of the computer box 90. A cap 69 is attached to the side member 20 to hold the filter 60 inside the longitudinal space 21. In the preferred embodiment, the filter 60 is a HEPA filter capable of trapping particle 0.3 micron in diameter.

Today, computer boxes are manufactured in various rectangular sizes. The most common dimensions are 7 to 10 inches in width and 12 to 24 inches in height. The front surface of the computer box may be flat or extend forward ½ to 1–¼ inches.

During use, the frame assembly 15 is placed around the computer box 90 adjacent to the front surface 91. The frame assembly 15 is positioned on the computer box 90 so that the inside surface of the lip member 24 is pressed tightly against the lower front edge of the computer box 90. The door assembly 45 may then be selectively opened or closed on the computer box 90.

In compliance with the statutes, the invention described herein has been described in language more or less specific as to structural features. It should be understood, however, that the invention is not limited to the specific features shown, since the means and construction shown comprise only the preferred embodiments for putting the invention into effect. The invention is therefore claimed in any of its forms or modifications within the legitimate and valid scope of the amended claims, appropriately interpreted in accordance with the doctrine of equivalents.

I claim:

1. A computer box filter system, comprising:
   a. computer box with side air vents formed thereon;
   b. a frame assembly including at least one, hollow side member with a longitudinally aligned center space, said center space being disposed over said side air vents, said side member having a plurality of inlet holes enabling air to enter said longitudinally aligned center space and transmitted to said side air vents in said computer box, said side member including a front surface and an outside surface;
   c. an attachment means on said frame assembly for aligning said frame assembly on said computer box;
   d. a lower transversely aligned member attached to said frame assembly capable of being pressed against the front surface of a computer box when said frame assembly is placed over the computer box, said lower transversely aligned member capable of preventing rearward movement of said frame assembly over the computer box during use;
   e. a filter placed inside said center space on said side member used to purify air as it travels through said side member; and,
   f. a door cover pivotally attached to said frame assembly.

2. The computer box filter system, as recited in claim 1, further including a plurality of air inlet holes formed on said outside surface of said side member.

3. A computer box filter system, comprising:
   a. computer box with side air vents formed thereon;
   b. a frame assembly including a top member and two side members connected together to form an inverted, u-shaped structure capable of being slidingly attached to a computer box, at least one said side member including a longitudinally aligned center space capable of being disposed over said side air vents on said computer box and having a plurality of inlet holes enabling air to enter said longitudinally aligned center space and transmit said side air vents on said computer box;
   c. a door cover pivotally attached to said frame assembly;
   d. an attached means on said frame assembly for aligning said frame assembly on said computer box; and,
   e. a filter inside said center spaced on said side member used to purify air as it travels through said side member.

4. A computer box filter cover, comprising:
   a. computer box with side air vents formed thereon;
   b. a frame assembly including at least one, hollow side member with a longitudinally aligned center space, said center space being disposed over said side air vents, said side member having a plurality of inlet holes enabling air to enter said longitudinally aligned center space and transmitted to said side air vents in said computer box, said side member including a front surface and a outside surface;
   c. an attachment means on said frame assembly for aligning said frame assembly on said computer box;
   d. an abutment means attached to said frame assembly capable of being pressed against the front surface of a computer box when said frame assembly is placed over the computer box, said abutment means being capable of preventing rearward movement of said frame assembly over the computer box during use;
   e. a filter placed inside said center spaced on said side member used to purify air as it travels through said side member; and,
   f. a door cover pivotally attached to said frame assembly.

* * * * *